United States Patent
Burian et al.

[11] Patent Number: 5,678,827
[45] Date of Patent: Oct. 21, 1997

[54] TANK CAR MANWAY GASKET

[75] Inventors: William F. Burian, Downers Grove, Ill.; Daniel T. Stevenson, Baytown, Tex.

[73] Assignee: Salco Products, Inc., Lemont, Ill.

[21] Appl. No.: 642,462

[22] Filed: May 3, 1996

[51] Int. Cl.[6] .................................... B60D 17/12
[52] U.S. Cl. .................. 277/37; 277/178; 277/183; 277/184; 49/490.1; 49/495.1; 105/377.07; 105/377.08; 220/357; 220/358
[58] Field of Search .............. 277/178, 37, 183, 277/184; 49/495.1, 490.1; 220/357, 358; 105/377.07, 377.08

[56] References Cited

U.S. PATENT DOCUMENTS

| 1,915,299 | 6/1933 | Draper | 220/358 |
| 2,234,485 | 3/1941 | Connor | 220/358 |
| 2,691,352 | 10/1954 | Bowden | 49/490.1 |
| 3,384,381 | 5/1968 | Hennessy, Jr. | 277/10 |
| 4,461,219 | 7/1984 | Bateson | 105/377.07 |
| 4,867,333 | 9/1989 | Kolp, Jr. et al. | 220/234 |

FOREIGN PATENT DOCUMENTS 9100830  1/1991  WIPO ........................ 220/357

*Primary Examiner*—William A. Cuchlinski, Jr.
*Assistant Examiner*—Christina Annick
*Attorney, Agent, or Firm*—Dorn, McEachran, Jambor & Keating

[57] ABSTRACT

A gasket for railroad car manways or hatches is mounted on the top of a loading nozzle. The gasket is a ring having an inverted J-shaped cross section. It is held in position by a long down leg and a short leg. The legs are joined by a bail. The junction between the outside surfaces of the bail and down leg has a chamfer to avoid interference with a closed manway cover. Chevrons are formed on the upper surface of the bail. A flexible loop engages a bolt bracket on the loading nozzle to prevent dislodging of the gasket during opening of the cover.

14 Claims, 1 Drawing Sheet

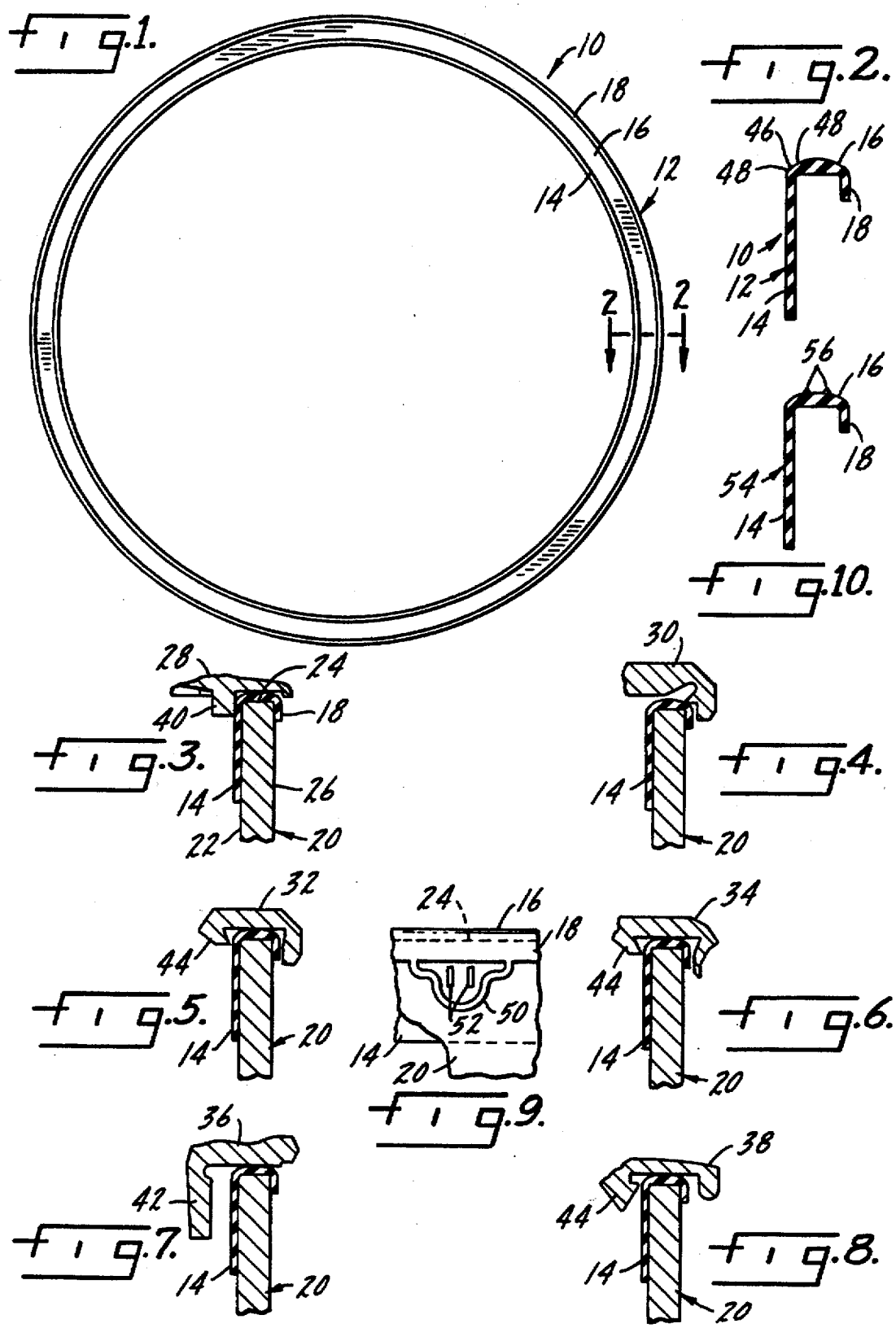

TANK CAR MANWAY GASKET

BACKGROUND OF THE INVENTION

This invention concerns a gasket for a manway opening in railroad cars, particularly tank cars. A manway or hatch provides access to the interior of the car for loading, venting and maintenance purposes. During transit the manway opening is closed by a cover. The cover is normally hinged and latched to the loading nozzle which is the upstanding tube surrounding the opening in the car body. The nozzle may be a plain cylindrical tube or it may have a rounded top edge known as a coaming. In tank cars it is normally a plain tube.

A gasket on the underside of the cover engages the nozzle or coaming to seal the opening. Traditionally the gasket has been attached to the cover by an adhesive or by mechanical fasteners of some type. Adhesive attachment is so effective it becomes virtually impossible to remove the gasket. For certain types of service such as food grade service (e.g., corn syrup) it is necessary to be able to remove the gasket to clean it and the cover. Adhesively attached gaskets cannot meet this requirement. Gaskets retained by bolts or other removable fasteners have the drawback of being relatively labor intensive, i.e., it takes a long time to put them on and take them off. Furthermore, nuts and bolts have to be stocked at a maintenance shop, they have a tendency to get lost, fall into open manways, etc. In other words, they are a nuisance to the car operator. But the biggest problem associated with cover-mounted gaskets is maintaining a large inventory of different gaskets to fit the wide variety of cover designs in use in the railroad industry. Unfortunately, each cover design requires its own unique gasket design. As a result a large inventory of different gaskets has to be kept at a maintenance shop.

SUMMARY OF THE INVENTION

The present invention concerns a universal gasket for a railroad car manway that is mounted on the loading nozzle instead of on the cover. Thus, the gasket will fit a particular size manway regardless of the cover design. The gasket is a generally J-Shaped member having inside and outside legs joined by a bail. When the gasket is installed the underside of the bail rests on the top land of the manway loading nozzle, with the inside or down leg disposed against the inside wall of the nozzle and the outside or short leg engaging the outside wall of the nozzle. The down leg is about five times as long as the short leg to provide stability and to prevent the gasket from rolling or peeling off of the nozzle. The corner defined at the junction of the bail and inside leg has a 45° chamfer. The chamfer is bounded by radiused portions. This corner shape avoids pinching of the gasket by certain cover designs. Chevrons on the top surface of the bail enhance the sealing action against the cover.

BRIEF DESCRIPTION OF THE DRAWINGS

FIG. 1 is a bottom plan view of the gasket of the present invention.

FIG. 2 is a section taken along line 2—2 of FIG. 1.

FIG. 3 is a section similar to FIG. 2 showing the gasket installed on a manway nozzle with a portion of a manway cover closed on the gasket.

FIGS. 4–8 are all sections similar to FIG. 3, each showing a different manway cover closed on the gasket. The interior of the manway is to the left in each Figure.

FIG. 9 is a side elevation view of a gasket retaining loop installed on a loading nozzle.

FIG. 10 is a section similar to FIG. 2, showing another embodiment of the gasket with chevrons included.

DETAILED DESCRIPTION OF THE INVENTION

FIGS. 1 and 2 illustrate one embodiment of the gasket 10 of the present invention. The gasket can be either compression molded or injection molded from a variety of commodity-sensitive materials such as butyl rubber, Viton (a DuPont trademark), EPDM or white nitrile. A Shore A durometer of about 70–75 is preferred. The gasket is a ring member 12 of an inverted J-shaped cross section formed by a down leg 14, a bail 16 and a short leg 18. The bail joins the legs, preferably at the ends thereof. The legs are separated by a distance approximately equal to the thickness of a manway loading nozzle 20. Thus, as shown in FIGS. 3–8, when the gasket is installed the down leg 14 engages the inside wall 22 of the nozzle, the underside of the bail 16 rests on the top land 24 of the nozzle, and the short leg engages the nozzle outer wall 26. When the gasket of the present invention is used, the gasket normally found in the manway cover or dome lid is removed.

Details of the gasket are best seen in FIG. 2. The down leg 14 is substantially longer than the short leg. This is to provide more part stability when the dome lid cover closes down on the ring member. The down leg also resists the tendency of the gasket to roll or peel off the nozzle. To provide this stability the down leg should be at least about four times as long as the short leg. For reference purposes only, it has been found that a down leg length of 2.0 inches and a short leg length of 0.375 inches (both measured from the bottom of the bail) are acceptable dimensions. The legs are about 0.125 inches thick.

The outside corner of the junction between the down leg 14 and bail 16 has a non-square corner that is important to the effectiveness of the gasket. In effect, the corner has some material removed to avoid interference with closing covers or dome lids. It will be understood that most if not all existing cover designs anticipated incorporating a gasket in the cover and thus did not anticipate the presence of a gasket on the top of the nozzle. Accordingly, no thought was given to providing clearance for a nozzle-mounted gasket during closure of a cover. Furthermore, the hinges connecting the cover to the loading nozzles are not perfectly tight. The holes for the hinge pins are actually slots so there is some degree of looseness in the fit between the cover and the manway opening. Some covers have a centering flange or wall for assisting alignment of the cover and for stiffening the cover. FIGS. 3–8 illustrate at 28–38 cross sections of the edges of the covers commonly encountered in U.S. railroad rolling stock. The covers 28 and 36 in FIGS. 3 and 7 have a depending wall 40 and 42 used for centering. Covers 32, 34 and 38 each have an edge of a flange 44 that approaches the inside corner of the nozzle and thus has a potential for pinching the corner of the gasket. The gasket of the present invention has material removed at this critical point to avoid being pinched upon closure of the cover. The corner of the gasket comprises a 45° chamfer 46 bounded on either side by a radiused portion 48. This shape provides the best chance for avoiding damage by the walls 40, 42 or flanges 44.

Looking now at FIG. 9, there is shown a gasket retaining loop 50 molded on the outside diameter of the ring. This generally U-shaped loop is used to tie the gasket to the manway attachment areas. In this case the loop 50 is shown wrapped around a dome lid bolt bracket 52. Preferably there are two such loops, one located as close as possible to the cover hinge and the other 180° from the hinge. The loops are used to prevent accidental removal of the gasket when opening the manway cover. The manway covers typically weigh about 85 pounds and they are held down with six or eight ⅞ inch dome lid bolts. It can happen that when the heavy cover is lifted the gaskets can be pulled off the loading nozzle and then fall down into the product which is in the tank car or hopper car. Loops 50 will prevent this from happening.

FIG. 10 illustrates another embodiment of the invention, which may be considered a preferred embodiment. Gasket 54 has two upraised portions or chevrons 56 which are located on the upper surface of the bail 16. The chevrons provide a little extra height to the seal to allow for irregularities in the construction of the manway. That is, the cover may not be perfectly flat or the hinge may be slightly misaligned or other circumstances may lead to a small variations in the gap to be filled by the gasket. The chevrons will take up extra space while also being deformable in areas where there is no such space.

While a preferred form of the invention has been shown and described, it will be realized that alterations and modifications may be made thereto without departing from the scope of the following claims.

We claim:

1. A gasket for sealing the junction between the loading nozzle of a railroad car manway and a closed manway cover, the gasket comprising a flexible ring member having a down leg and a short leg joined by a bail, the legs being separated by a distance sufficient to allow the top of the loading nozzle to fit between the legs when the gasket is installed on the loading nozzle, the down leg being engageable with the nozzle and having a length at least four times that of the short leg.

2. The gasket of claim 1 wherein the down leg is at the inside diameter of the ring member.

3. The gasket of claim 1 wherein the down leg and bail are joined at a junction having an outer surface which defines a non-square corner.

4. The gasket of claim 3 wherein said corner includes a chamfered portion joined to the down leg and bail.

5. The gasket of claim 4 wherein the chamfered portion of the corner is joined to the down leg and bail by radiused portions.

6. The gasket of claim 1 further comprising a loop depending from the ring member, the loop being engageable with the loading nozzle to prevent inadvertent gasket removal upon opening of a manway cover.

7. The gasket of claim 1 wherein the upper surface of the bail is convex.

8. The gasket of claim 1 further comprising at least one chevron located on the upper surface of the bail.

9. A gasket for sealing the junction between the loading nozzle of a railroad car manway and a manway cover, the gasket comprising a down leg and a short leg joined by a bail, the legs being separated by a distance sufficient to allow the top of the loading nozzle to fit between the legs when the gasket is installed on the loading nozzle, the down leg being engageable with the nozzle, the down leg and bail being joined at a junction having an outer surface defining a corner which includes a chamfered portion joined to the down leg and bail.

10. The gasket of claim 9 wherein the chamfered portion of the corner is joined to the down leg and bail by radiused portions.

11. The gasket of claim 9 wherein the down leg has a length at least four times that of the short leg.

12. The gasket of claim 11 wherein the down leg is at the inside diameter of the gasket.

13. The gasket of claim 9 further comprising a loop depending from the gasket, the loop being engageable with the loading nozzle to prevent inadvertent gasket removal upon opening of a manway cover.

14. The gasket of claim 9 further comprising at least one chevron located on the upper surface of the bail.

* * * * *